(12) United States Patent
Kosuga et al.

(10) Patent No.: US 7,504,001 B2
(45) Date of Patent: Mar. 17, 2009

(54) METHOD FOR PRODUCING PAPER AND AGENT FOR IMPROVING YIELD

(75) Inventors: Masanori Kosuga, Chiba (JP); Masatomi Ogawa, Chiba (JP); Yoshiaki Koga, Yamaguchi (JP)

(73) Assignees: Seiko PMC Corporation, Tokyo (JP); Tokuyama Corporation, Yamaguchi (JP)

( * ) Notice: Subject to any disclaimer, the term of this patent is extended or adjusted under 35 U.S.C. 154(b) by 370 days.

(21) Appl. No.: 10/509,893

(22) PCT Filed: Mar. 31, 2003

(86) PCT No.: PCT/JP03/04095

§ 371 (c)(1),
(2), (4) Date: Aug. 18, 2005

(87) PCT Pub. No.: WO03/083212

PCT Pub. Date: Oct. 9, 2003

(65) Prior Publication Data

US 2006/0011317 A1   Jan. 19, 2006

(30) Foreign Application Priority Data

Apr. 3, 2002   (JP) ............................. 2002-101857

(51) Int. Cl.
*D21H 11/00* (2006.01)
(52) U.S. Cl. .................................... 162/181.6; 162/183
(58) Field of Classification Search ............... 162/181.6, 162/183
See application file for complete search history.

(56) References Cited

U.S. PATENT DOCUMENTS

| | | |
|---|---|---|
| 4,388,150 A | 6/1983 | Sunden et al. |
| 4,954,220 A | 9/1990 | Rushmere |
| 4,964,954 A | 10/1990 | Johansson |
| 4,980,025 A | 12/1990 | Andersson et al. |
| 5,597,512 A | 1/1997 | Watanabe et al. |
| 6,372,089 B1 * | 4/2002 | Keiser et al. ............. 162/181.6 |

FOREIGN PATENT DOCUMENTS

| | | |
|---|---|---|
| CN | 1238819 A | 6/1998 |
| EP | 0 357 574 A2 | 3/1990 |
| JP | 30-003526 B | 5/1955 |
| JP | 46-020137 B | 6/1971 |
| JP | 57-51900 | 3/1982 |
| JP | 62-15391 | 1/1987 |
| JP | 62-110998 A1 | 5/1987 |
| JP | 2-19238 | 1/1990 |
| JP | 02-074695 A1 | 3/1990 |
| JP | 2-229297 | 9/1990 |
| JP | 6-11957 | 1/1994 |
| WO | WO-86/05826 | 10/1986 |
| WO | WO-88/06659 | 9/1988 |
| WO | WO-98/23815 | 6/1998 |

OTHER PUBLICATIONS

Chinese Office Action dated Apr. 14, 2006.
International Search Report for PCT/JP03/04095 mailed on Jul. 8, 2003.

* cited by examiner

*Primary Examiner*—Mark Halpern
(74) *Attorney, Agent, or Firm*—Cheng Law Group PLLC

(57) ABSTRACT

The objective of the present invention is to provide a paper-making method that can enhance the retention in the paper-making steps. This invention provides a method including making paper by adding to pulp slurry a silica sol which is prepared through a reaction between an aqueous solution of sodium silicate and a mineral acid, and which has, under a $SiO_2$ concentration from 15 to 50 g/L wherein the value of the concentration is shown by [C], a viscosity from $0.12 \times [C]$ mPa·s to 15 mPa·s measured at 25° C, and a cationic component and/or an amphoteric component.

12 Claims, 1 Drawing Sheet

US 7,504,001 B2

METHOD FOR PRODUCING PAPER AND AGENT FOR IMPROVING YIELD

This application is a 371 of PCT/JP03/04095 filed 31 Mar. 2003.

TECHNICAL FIELD

The present invention relates to a method of papermaking and a retention aid. More particularly, the invention relates to a papermaking method by which the retention of fines and fillers is remarkably improved and a retention aid which can be employed in the method.

BACKGROUND ART

Papermaking processes strongly require an improvement in the retention of fines and fillers in pulp slurry in the process in order to increase their productivity. The retention in this context means the proportion of the amount of the solids, such as fines and fillers, which do not pass through the pulp layer formed on the wire in papermaking, to the entire amount of the solids. As the proportion becomes greater, the retention becomes better.

On the other hand, the closed-system treatment of white water, in which white water is circulated and reused in the preparation of pulp slurry to decrease the amount of water discharged to the outside of the system, has been forwarded. In this closed system, since white water once used in the papermaking is treated and reused, it becomes important to reduce the amount of fines and fillers which are in the white water and do not remain on the paper, as much as possible.

In order to make the fines and fillers remain on the paper have been proposed various methods of adding to pulp slurry retention aids which comprise a silica sol, and an additive such as a cationic or anionic high molecular weight polyacrylamide compound. Examples of the methods are as follows:

(1) using a cationic starch and a colloidal silicic acid in pulp slurry that includes a filler, from which slurry paper is made (in JP57-51900, A)

(2) using a cationic or amphoteric carbohydrate and a colloidal silicic acid modified with aluminum (in JP2-19238, A)

(3) using a cationic poly(meth)acrylamide compound and a colloidal silicic acid (in JP62-15391, A)

(4) using a retention aid comprising a cationic polyacrylamide, and aluminum silicate or a colloidal silicic acid modified with aluminum (in Japanese Translated PCT Application Publication No. 63-500190)

(5) using a retention aid such as that including a cationic polyacrylamide compound or a polyethylene imine, and a polyaluminum compound together with a colloidal silicic acid and a colloidal silicic acid modified with aluminum (in Japanese Translated PCT Application Publication No. 1-502519)

(6) using a cationic synthesized compound including a cationic polyacrylamide retention aid, an aluminate, and an inorganic colloid (in JP2-99692, A)

(7) using an aluminum compound, a cationic polymer retention aid, and a polymeric silicic acid having a specific surface area of 1050 $m^2$/g or more (in JP6-11957, B)

(8) using a water-soluble cationic polymer and a water-soluble polysilicate microgel (in JP2-229297, A)

Although the employment of the aforementioned methods which use a composition including silica sol and the additive can enhance the retention to some extent, the enhancement was not sufficient and there was room for further improvement.

SUMMARY OF THE INVENTION

An objective of the present invention is to provide a method capable of imparting a remarkably high retention to fines and fillers in pulp slurry in a process of papermaking that includes a step of adding to the pulp slurry a composition, as a retention aid, which comprises silica sol and a cationic and/or amphoteric component.

Another objective of the present invention is to provide a retention aid that can preferably be used in the aforementioned method.

DISCLOSURE OF THE INVENTION

As a result of intensive study by the inventors, they found out that when a silica sol made by sodium silicate and a mineral acid had a viscosity within a special range at a predetermined concentration, the addition of this silica sol and a cationic and/or amphoteric component to pulp slurry was able to achieve the objectives. In this addition, the silica sol of a high concentration per se or a diluted silica sol may be used. This discovery led to the completion of the present invention.

Therefore, the present invention provides a method of papermaking which includes a step of adding a silica sol and a cationic and/or amphoteric component to pulp slurry, wherein the silica sol is obtainable by a reaction between an aqueous solution of sodium silicate and a mineral acid, and has, at a $SiO_2$ concentration [C] of 15-50 g/L, a viscosity ranging between 0.12× the value of the concentration [C] mPa·s and 15 mPa·s at 25° C.

In this specification, the viscosity of a silica sol was measured using a BL viscometer produced by Tokimec Inc. with a No. 1 rotor, at 60 rpm and at 25° C.

Another aspect of the invention is a retention aid comprising a silica sol which is obtainable by a reaction between an aqueous solution of sodium silicate and a mineral acid, and has, at a $SiO_2$ concentration [C] of 15-50 g/L, a viscosity ranging between 0.12× the value of the concentration [C] mPa·s and 15 mPa·s at 25° C.

DETAILED DESCRIPTION OF THE PREFERRED EMBODIMENTS

<Silica Sol>

Figure 1:
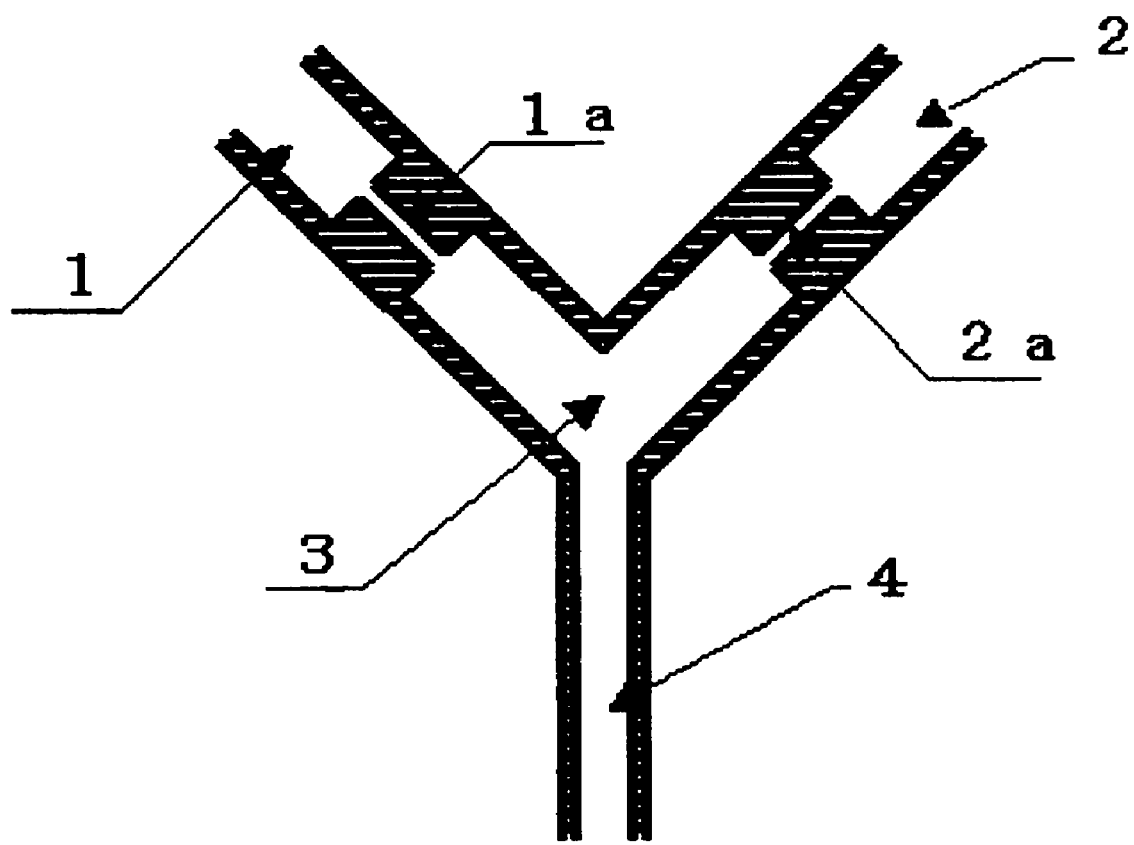
FIG. 1 is an illustration that shows a Y-shaped tube reactor.

The silica sol used in the present invention is a sol obtained by the reaction between an aqueous solution of sodium silicate and a mineral acid. It is essential that the sol has, at a $SiO_2$ concentration [C] of 15-50 g/L, a viscosity ranging between 0.12× the value of the concentration [C] mPa·s and 15 mPa·s at 25° C.

Specifically, the addition of a sol having a viscosity less than 0.12× the value of the concentration [C] mPa·s in the $SiO_2$ concentration range, even if the sol has been prepared by the reaction between an aqueous solution of sodium silicate and a mineral acid, with a cationic component and/or an amphoteric component, which will be explained hereinafter, to pulp slurry cannot improve the retention and achieve the objective of the present invention. This is true with both of the sol per se and a diluted sol. On the other hand, a sol, prepared from the same raw materials, of which viscosity exceeds 15 mPa·s in the $SiO_2$ concentration range will lower the storage stability of the sol and cannot further the improvement in the retention, which are economically disadvantageous.

As understood, one characteristic of the silica sol according to the present invention is that it has a relatively higher viscosity in the $SiO_2$ concentration range compared to silica sols used as a conventional retention aid. Specifically, a conventional silica sol has a viscosity less than 2.5 mPa·s at most at a $SiO_2$ concentration of 25 g/L.

Note that the $SiO_2$ concentration range of the silica sol is limited to define the condition under which the viscosity range is given, and not to define the range in which the $SiO_2$ concentration of the silica sol to be added should be. In this sense, the concentration of the silica sol at which the viscosity is measured may be called the standard concentration. The silica sol may be diluted, stored, and used after storage for a period, which is one embodiment associated with the silica sol according to the present invention. The degree of the dilution is decided depending on the situation.

It is surmised that the reason that the viscosity of the silica sol used in the present invention is higher at the standard concentration is that the polymerization of silica is advanced compared with a conventional silica sol, which leads to the development of the structure formed from a chain-like bonding of silica. It is also supposed that the addition of the silica sol, containing a highly developed chain-like structure of silica, together with a cationic component and/or an amphoteric component to pulp slurry will bring about an improved retention.

On the other hand, a colloidal silica, or a silica sol which has a relatively low concentration of $SiO_2$ and is prepared with an ion-exchange resin, has a low viscosity in that concentration range. Therefore this silica sol can clearly be distinguished from the silica sol of the present invention.

There is no special limitation on the method of producing the silica sol according to the present invention. The silica sol is suitably prepared by reacting an aqueous solution of sodium silicate with a mineral acid at a high concentration, adjusting the $SiO_2$ concentration [C] to 100-200 g/L, subjecting the reacted to aging, so that a high concentration silica sol, the viscosity of which, measured at this concentration, is from $0.06 \times [C]$ mPa·s to 30 mPa·s, and diluting the high concentration silica sol. In this process, the pH value of the silica sol after the reaction should be from 1.3 to 3, particularly from 1.3 to 2.5, because this pH range can make the silica sol, having a high concentration from 100 g/L to 200 g/L, stable without causing gelation, and the fact that the silica sol is stable enables the silica sol to age.

Examples of the mineral acid are sulfuric acid and hydrochloric acid. Sulfuric acid is particularly preferable.

The concentration of the aqueous solution of sodium silicate and that of the aqueous mineral acid solution are appropriately decided, so that the $SiO_2$ concentration [C] of the obtained high concentration silica sol will be in the range between 100 g/L and 200 g/L. A preferable example is as follows: For the aqueous solution of sodium silicate, the molar ratio of $SiO_2$ to $Na_2O$ is typically from 2.5 to 4.0, and the concentration of $SiO_2$ is from 100 g/L to 300 g/L, preferably from 200 g/L to 290 g/L. The mineral acid concentration of the aqueous mineral acid solution is typically from 100 g/L to 250 g/L, preferably from 150 g/L to 220 g/L.

The reaction between the aqueous sodium silicate solution and the aqueous mineral acid solution proceeds by colliding them at a temperature ranging between 20° C. and 40° C. under a normal pressure and let the mixture age. Preferably, a vigorous mixing, to such an extent that the solutions collide with each other, can make the reaction proceed without causing partial gelation, which will result in a homogeneous mixture.

The reaction between the aqueous sodium silicate solution and the aqueous mineral acid solution may suitably be carried out, for example, in the following way.

Specifically, the employment of a Y-shaped reactor having two reactant feeding tubes 1, 2, a mixing part 3 communicating with both of the tubes, and a discharging part 4 connected to the mixing part, as shown in FIG. 1, may be effective in order to react the aqueous mineral acid solution with the aqueous sodium silicate solution so that a homogeneous and high concentration silica sol which has a $SiO_2$ concentration and a pH value of the above-mentioned ranges. The optimal method using the reactor may include the step of feeding the aqueous mineral acid solution and the aqueous sodium silicate solution through the respective two tubes to let them react in a colliding way, and the step of taking out the reacted through the discharging pipe.

It is preferable if the respective feeding tubes are provided with throttled parts 1a, 2a, which accelerate the flow velocities of the fed reactants to make them react sufficiently by collision.

In this method, the respective flow velocities of the aqueous mineral acid solution and the aqueous sodium silicate solution, each of which is fed through each feeding tube, are preferably 10 m/s or more. Also, the reaction product is preferably discharged from the mixing part at a flow velocity of 1 m/s or more.

The high concentration silica sol thus obtained has a $SiO_2$ concentration within the range between 100 g/L and 200 g/L. When the $SiO_2$ concentration is less than 100 g/L, the polymerization of silica may not proceed sufficiently in the following aging step, which may reduce the retention improving effect of the obtained silica sol. On the other hand, when the $SiO_2$ concentration [C] exceeds 200 g/L, gelation may be caused, which may make the control of the viscosity difficult.

The aging is carried out so that the viscosity of the high concentration silica sol is in the range between $0.06 \times [C]$ mPa·s and 30 mPa·s. The time necessary to achieve a viscosity in this range is usually from 30 to 200 minutes, preferably from 60 to 200 minutes.

As mentioned above, if a silica sol, having a $SiO_2$ concentration [C] within the range between 100 g/L and 200 g/L, has been adjusted so that it has a pH value of 3 or less, preferably 1.3-3, more preferably 1.3-2.5 prior to the aging step, the polymerization of silica is carried out sufficiently in the following aging step without causing gelation.

An example of the silica sol that has a pH value of more than 3 after dilution is the one used in reference (8) above. Because of the method of producing it, the silica sol of the reference (8) is so unstable that it includes partial gel just after the preparation. Therefore it is difficult to make a high concentration silica sol by the method of reference (8). Even if it is possible, a stable silica sol, which can be subjected to aging, cannot be obtained. As a result, a silica sol which has a high viscosity to the concentration and keeps stable as time passes cannot be obtained.

The high concentration silica sol may be diluted and stored, or added to pulp slurry.

When stored, the high concentration silica sol should be diluted so that the $SiO_2$ concentration will be in the range between 15 g/L and 50 g/L; this concentration range provides excellent storage stability and makes easy to handle the silica sol. The silica sol diluted to the concentration in the range has a viscosity of $0.12 \times [C]$ mPa·s to 15 mPa·s at 25° C.

The silica sol used in the present invention should have a pH value of 3 or less, preferably 1.5 to 3, more preferably 1.5 to 2.5 in the concentration range to provide excellent storage stability. In other words, the silica sol having a pH value of less than 3 in the concentration range prevents the silica sol from gelling for a long time, and therefore is able to prolong the storage period from the preparation of the silica sol to the addition to pulp slurry.

Due to the specific $SiO_2$ concentration as mentioned above, the silica sol according to the present invention can be sold on the market as a retention aid.

In summary, the present invention provides a retention aid including a silica sol, obtained by the reaction between an aqueous solution of sodium silicate and a mineral acid, which silica sol has a $SiO_2$ concentration [C] from 15 to 50 g/L and has a viscosity from $0.12 \times [C]$ mPa·s to 15 mPa·s under the concentration range at 25° C.

While the retention aid, having a $SiO_2$ concentration from 15 to 50 g/L, is being stored, the silica sol may make a further aging, which results in a more enhanced retention improving effect. This aging is the aging at the second stage, while the aging when the high concentration silica sol is prepared is the one at the first stage. During the aging at the second stage, the chain of silica having been made by polymerization is maintained and may even be lengthened by a further polymerization.

When the retention aid is added to pulp slurry after the storage, the silica sol, having a concentration within the above-mentioned range, may directly be added to pulp slurry together with a cationic component and/or an amphoteric component, which will be described hereinafter. Preferably, it should be added after diluted to a one having a $SiO_2$ concentration of 0.001 g/L or more to less than 15 g/L, particularly 0.001 g/L or more to 10 g/L, so that the addition to pulp slurry will be carried out more homogeneously.

In another aspect, the present invention provides a method of papermaking which includes the step of preparing a high concentration silica sol having a $SiO_2$ concentration [C] from 100 to 200 g/L and having a viscosity from $0.06 \times [C]$ to 30 mPa·s measured at 25° C., the step of diluting the high concentration sol to a silica sol having a $SiO_2$ concentration [C] from 15 to 50 g/L and having a viscosity from $0.12 \times [C]$ to 15 mPa·s measured at 25° C., the step of storing the diluted sol, and the step of further diluting the diluted sol and adding the further diluted together with a cationic component and/or an amphoteric component to pulp slurry.

The method described in the preceding paragraph is an embodiment in which the high concentration silica sol is diluted to a silica sol having a concentration from 15 to 50 g/L, the diluted silica sol is further diluted, and the further diluted is added to pulp slurry. The present invention also includes an embodiment in which the high concentration silica sol is diluted to a silica sol having a $SiO_2$ concentration from 0.001 g/L or more to less than 15 g/L, particularly 0.001 g/L or more to 10 g/L, at one time and the diluted is added to pulp slurry, as long as the silica sol has, in the standard concentration [C], a viscosity from $0.12 \times [C]$ to 15 mPa·s.

<Cationic Component and/or Amphoteric Component>

The cationic component and/or amphoteric component used in the present invention is explained in the followings.

The cationic component employed in the present invention includes, for example, (1) a cationic starch, (2) a cationic polyacrylamide compound, (3) a cationic high polymer prepared by polymerizing one or more cationic monomers, (4) an amine-epihalohydrin resin, and (5) a polyamide-epihalohydrin resin. The amphoteric component employed in the present invention includes, for example, (6) an amphoteric starch and (7) an amphoteric polyacrylamide compound. This invention may employ one or more components belonging to one group selected from the groups (1)-(7), or two or more components respectively belonging to two or more groups selected from the groups (1)-(7) above.

(1) Cationic Starch

The cationic starch used in the present invention may be prepared by making cationic an ordinary starch, such as corn starch, glutinous corn starch, wheat starch, potato starch, tapioca starch, with a cationizing agent. The cationizing agent includes dimethylaminoethylchloride, 3-chloro-2-hydroxypropyl-trimethyl ammonium chloride, and glycidyl trimethyl ammonium chloride. The degree of substitution with cationic substituents is between 0.01 and 1.0, preferably between 0.02 and 0.5.

(2) Cationic Polyacrylamide Compound

The cationic polyacrylamide compound used in the present invention includes a copolymer obtained by copolymerizing a cationic monomer and an acrylamide compound, and reaction products prepared through a Hoffmann rearrangement or a Mannich modification of a polyacrylamide compound, or an amide-exchange reaction of a polyacrylamide compound with a polyamine.

One method to prepare a cationic polyacrylamide compound used in the present invention is to copolymerize a cationic monomer and an acrylamide compound. The cationic monomer used includes, for example, the compounds represented by formulas (1), (2) and (3) below, diallyldimethyl ammonium chloride, and diallylamine. These compounds may be used alone or in combination.

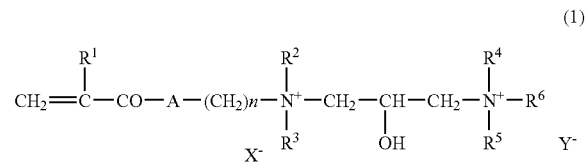

(1)

In formula (1), A denotes oxygen atom or NH; n is an integer of 2 to 4; $R^1$ is hydrogen atom or methyl group; $R^2, R^3, R^4, R^5$, and $R^6$, which may be the same or different from each other, mean a lower alkyl group having 1 to 3 carbon atoms; and $X^-$ and $Y^-$, which may be the same or different from each other, are anionic groups.

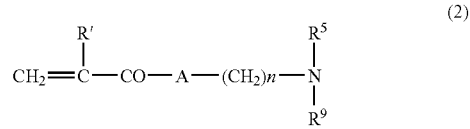

(2)

In formula (2), A denotes oxygen atom or NH; n is an integer of 2 to 4; $R^7$ is hydrogen atom or methyl group; and $R^8$ and $R^9$, which maybe the same or different from each other, respectively mean a lower alkyl group having 1 to 3 carbon atoms.

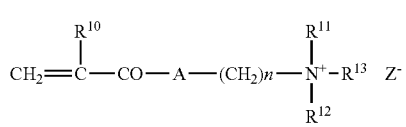

(3)

In formula (3), A denotes oxygen atom or NH; n is an integer of 2 to 4; $R^{10}$ is hydrogen atom or methyl group; $R^{11}$ and $R^{12}$, which may be the same or different from each other, respectively mean a lower alkyl group having 1 to 3 carbon atoms; $R^{13}$ is a lower alkyl group or benzyl group; and $Z^-$ denotes an anionic group.

Cationic monomers corresponding to those represented by formula (1) are, for example, 2-hydroxy-N,N,N,N',N'-pentamethyl-N'-(3-(meth)acryloylaminopropyl)-1,3-propane-diammoniumdichloride, and 2-hydroxy-N-benzyl-N,N-diethyl-N',N'-dimethyl-N'-(2-(meth)acryloyloxyethyl)-1,3-propane-diammoniumdibromide.

The cationic monomers belonging to those represented by formula (2) include, for example, N,N-dimethylaminoethyl-(meth)acrylate, and N,N-dimethylaminopropyl(meth)-acrylamide.

The cationic monomers belonging to those represented by formula (3) may be obtained by quaternarizing the cationic monomer represented by formula (1) with an appropriate quaternarizing agent, such as an alkyl halide, a dialkyl carbonate, an alkyl tosylate, an alkyl mesylate, a dialkyl sulfate, or a benzyl halide. The obtained cationic monomers include, for example, N-ethyl-N,N-dimethyl-(2-(meth)acryloyloxyethyl)ammonium bromide, and N-benzyl-N,N-dimethyl-(3-(meth)acryloylaminopropyl)ammonium chloride.

In addition to the reaction between an acrylamide compound and a cationic monomer expressed by formula (2) after the quaternarization thereof, the quaternarization with the qaternarizing agent above may be carried out during or after the polymerization of an acrylamide compound and a cationic monomer of formula (2). In this case, although all the cationic monomers may be quaternarized, part of them may be quaternarized.

The present invention may employ cationic monomers other than those represented by formulas (1), (2) and (3). Also, N-vinylformamide may be used as a monomer. Cationic groups may be introduced through hydrolysis after polymerizing N-vinylformamide monomers.

The acrylamide compound for the cationic polyacrylamide compound used in the present invention is, for example, acrylamide or methacrylamide. Other than these may be employed a lower alkyl acrylamide in which at least one hydrogen atom bonded to the nitrogen atom is replaced with the lower alkyl group, such as N-ethylacrylamide, N-methylacrylamide, N,N-dimethylacrylamide, or N-isopropylacrylamide. These compounds maybe used alone or in combination. Also, a nonionic monomer, such as acrylonitrile, methyl (meth)acrylate, or ethyl (meth)acrylate, maybe used together with the cationic monomer. The amount of the nonionic monomer is such that the water-solubility of the cationic monomer is not hampered.

The amount of the cationic monomer is 0.5 to 90 mol %, preferably 5 to 50 mol %, basedon the total amount of the cationic monomer and the acrylamide compound.

The Mannich-modified acrylamide compound used in the present invention may be prepared by modifying a polyacrylamide compound with formaldehyde and an amine through a Mannich reaction.

For the polyacrylamide compound may be used the cationic polyacrylamide compound. Amines that are typically used in the Mannich reaction are, for example, aliphatic secondary amines, such as dimethylamine or diethylamine. Known primary amines may be used together with the secondary amine. The degree of modification through the Mannich reaction should be 1 mol % or more, preferably 10 mol % or more. When the degree is less than 1 mol %, a sufficient improvement in drainage may not be achieved. The degree of Mannich modification means the mol percent of formaldehyde and the amines used based on the amide groups in the polyacrylamide compound.

(3) High Cationic Polymer

The cationic monomer used for the high cationic polymer of the present invention includes the cationic monomer employed for the cationic polyacrylamide compound described above. A single kind of the cationic monomer may be used, while two or more kinds may be used together. The amount of the cationic monomers should be 90 mol % or more. The polymerization reaction may involve comonomers, in an amount of 10 mol % or less, which may be a nonionic monomer such as acrylonitrile, (meth)acrylamide, methyl (meth)acrylate, and ethyl (meth)acrylate; an anionic monomer, examples of which are an α,β-unsaturated monocarboxylic acid such as acrylic acid and methacrylic acid, an α,β-unsaturated dicarboxylic acid such as maleic acid, fumaric acid, itaconic acid, and citraconic acid, and an unsaturated sulfonic acid such as styrene sulfonic acid and vinyl sulfonic acid, and a salt thereof such as a sodium salt, a potassium salt and an ammonium salt.

(4) Amine-Epihalohydrin Resin

An amine-epihalohydrin resin used in the present invention is obtained by reacting an amine with an epihalohydrin. There is no special limitation on the amine, as long as it has at least one amino group that can react with an epihalohydrin in the molecule. Generally, one or more amines selected from the group consisting of primary amines, secondary amines, tertiary amines, polyalkylene polyamines, and alkanolamines may be used. Preferably, the amine should include at least one secondary amine, or a combination of the secondary amine and an amine other than the secondary amine, for example, at least one selected from the group consisting of a primary amine, a tertiary amine, a polyalkylene polyamine, and an alkanolamine, which will be abbreviated here to "a primary amine and the like". The secondary amine includes, for example, an aliphatic secondary amine, an aromatic secondary amine, an alicyclic secondary amine, and a cyclic secondary amine. Among them is preferred an aliphatic secondary amine. The secondary amine may be used singly or in combination with others. The aliphatic secondary amine includes, for example, a dialkylamine that has two alkyl groups each including 1 to 20 carbon atoms or two phenylalkyl groups each including 7 to 20 carbon atoms. Specific examples are dimethylamine, diethylamine, dipropylamine, methylethylamine, methylpropylamine, methylbutylamine, methyloctylamine, methyllaurylamine, and dibenzylamine. Among them are especially preferred dimethylamine and diethylamine. The aromatic secondary amine includes, for example, an N-alkylaniline, an N-alkyltoluidine, or an N-alkylnaphthylamine, in which an alkyl group having 1 to 20 carbon atoms or a phenylalkyl group having 7 to 20 carbon atoms is bonded to the nitrogen atom. Specific examples are N-methylaniline, N-ethylaniline, N-propylaniline, N-butylaniline, N-pentylaniline, N-hexylaniline, N-octylaniline, N-decylaniline, N-laurylaniline, N-benzylaniline, N-methyltoluidine, N-ethyltoluidine, N-propyltoluidine, N-butyltoluidine, N-pentyltoluidine, N-hexyltoluidine, N-octyltoluidine, N-decyltoluidine, N-lauryltoluidine, N-benzyltoluidine, N-methylnaphthylamine, N-ethylnaphthylamine, N-propylnaphthylamine, N-butylnaphthylamine, N-pentylnaphthylamine, N-hexylnaphthylamine, N-octylnaphthylamine, N-decylnaphthylamine, N-laurylnaphthylamine, and N-benzylnaphthylamine. Among these N-alkylanilines are especially preferred N-methylaniline and N-ethylaniline. The aromatic secondary amine also includes those in which two aromatic rings are bonded to the nitrogen atom. Specific examples are diphenylamine, N-phenyl-o-toluidine, N-phenyl-m-toluidine, N-phenyl-p-toluidine, N-tolyl-o-toluidine, N-tolyl-m-toluidine, N-tolyl-p-toluidine, N-phenylaminopyridine, N-tolylamino-pyridine, N-phenylnaphthylamine, and N-tolyl-naphthylamine. Among these amines, diphenylamine is especially preferable. The alicyclic secondary amine includes, for example, an amine, the nitrogen atom of which is bonded with one or two carbon rings. Specific examples are a N-alkylcyclohexylamine such as N-methylcyclohexylamine, N-ethylcyclohexylamine, N-propylcyclohexylamine, N-butylcyclohexylamine, N-hexylcyclohexylamine, N-octylcyclohexylamine, N-decylcyclohexylamine, and N-laurylcyclohexylamine; a N-alkylcyclooctylamine such as N-methylcyclooctylamine, N-ethylcyclooctylamine, N-propylcyclooctylamine, N-butylcyclooctylamine, N-hexylcyclooctylamine, N-octylcyclooctylamine, N-decylcyclooctylamine, and N-laurylcyclooctylamine; and a dicycloalkylamine such as dicyclohexylamine and dicyclooctylamine. Among these alicyclic secondary amines is especially preferred dicyclohexylamine. Examples of the cyclic secondary amine are piperazine, piperidine, and methylpiperidine.

The primary amine includes, for example, an aliphatic primary amine, an aromatic primary amine, and an alicyclic primary amine. One species of the primary amine may be used, while two or more species may be used together. The aliphatic primary amine includes, for example, an alkylamine having an alkyl group that includes 1 to 20 carbon atoms or a phenylalkyl group that includes 7 to 20 carbon atoms. Specific examples are methylamine, ethylamine, propylamine, isopropylamine, allylamine, N-butylamine, sec-butylamine, tert-butylamine, pentylamine, 2-pentylamine, hexylamine, 2-aminohaxane, 3-aminohexane, monooctylamine, and benzylamine. Among these aliphatic primary amines are especially preferred methylamine, ethylamine, propylamine, isopropylamine, N-butylamine, sec-butylamine, and tert-butylamine. The aromatic primary amine includes, for example, a primary amine, the nitrogen atom of which is bonded with a benzene ring, a fused benzene ring, or a heteroaromatic ring. Specific examples are aniline, toluidine, biphenylaniline, naphthylamine, aminopyridine and amino picoline. The alicyclic primary amine is a primary amine, the nitrogen atom of which is bonded to a carbon ring. Specific examples of the alicyclic primary amine are cyclohexylamine and cyclooctylamine.

The tertiary amine includes, for example, an aliphatic tertiary amine, an aromatic tertiary amine, and an alicyclic tertiary amine. One species of the tertiary amine may be used, while two or more species may be used together. The aliphatic tertiary amine includes, for example, an amine that has three alkyl groups each including 1 to 20 carbon atoms or a phenylalkyl group including 7 to 20 carbon atoms. Specific examples are trimethylamine, triethylamine, tripropylamine, triisopropylamine, tri-N-butylamine, tri-sec-butylamine, tri-tert-butylamine, tripentylamine, trihexylamine, trioctylamine, and tribenzylamine. Among these aliphatic tertiary amines, trimethylamine and triethylamine are especially preferable. The aromatic tertiary amine includes, for example, a tertiary amine, the nitrogen atom of which is bonded with at least one benzene ring, one fused benzene ring, or one heteroaromatic ring. Specific examples are dimethylaniline, diethylaniline, dimethyltoluidine, diethyltoluidine, N-methyldiphenylamine, N-ethyldiphenylamine, N-methylditolylamine, N-ethylditolylamine, and triphenylamine. The alicyclic tertiary amine is a tertiary amine, the nitrogen atom of which is bonded with at least one carbon ring. Specific examples of the alicyclic tertiary amine are dimethylaminocyclohexane, dicyclohexylaminomethane, dimethylaminocyclooctane, dicyclooctylaminomethane, tricyclohexylamine, and tricyclooctylamine.

The polyalkylenepolyamine includes a compound that has at least two primary amino groups and at least one secondary amino group. Typical examples are diethylenetriamine, triethylenetetramine, tetraethylenepentamine, pentaethylenehexamine, heptaethyleneoctamine, nonanethylenedecamine, and triethylenebis(trimethylene)hexamine. These polyalkylenepolyamines may be used singly, or two or more compounds may be used together.

The alkanolamine includes an amine having at least one hydroxyl group. Specific examples are monoethanolamine, diethanolamine, N-methylethanolamine, triethanolamine, N,N-diethylethanolamine, N,N-dimethylethanolamine, N-methyldiethanolamine, N,N-dibutylethanolamine, and N-(2-aminoethyl)ethanolamine. These alkanolamines may be used singly, or two or more compounds may be used together.

Other than the above-mentioned primary amine, tertiary amine, polyalkylenepolyamine and alkanolamine, a diamine having one or more carbon rings may be employed. Examples of this diamine are 1,3-diaminocyclohexane, 1,4-diaminocyclohexane, 4,4'-diamino-3,3'-dimethyldicyclohexane, 4,4'-bis(paraminocyclohexyl)methane, isophoronediamine, 1,3(or 2,4)-bis-(aminomethyl)cyclohexane, N-aminopropylcyclohexylamine, octahydro-4,7-methanoindene-1(or 2),5(or 6)-dimethaneamine, 2,2'-bis-(4-aminocyclohexyl) methane, 4,4'-oxybis(cyclohexylamine), 4,4'-sulfonbis(cyclohexyl-amine), 1,3,5-triaminocyclohexane, and a 2,4'(or 4,4')-diamino-3,3',5,5'-tetraalkyldicyclohexylalkane. Furthermore may be used an alkylenediamine, examples of which are ethylenediamine, trimethylenediamine, propylenediamine, and dimethylaminopropylamine.

The epihalohydrin includes, for example, epichlorohydrin and epibromohydrin. These compounds may be used singly or in combination.

(5) Polyamidepolyamine-epihalohydrin Resin

The polyamidepolyamine-epihalohydrin resin used in the present invention may be prepared by reacting an epihalohydrin with a condensate between a polyalkylenepolyamine and a dibasic carboxylic acid or a derivative thereof.

The polyalkylenepolyamine includes, for example, ethylenediamine, diethylenetriamine, triethylenetetramine, tetraethylenepentamine, and imino-bis-propylamine. The dibasic carboxylic acid includes, for example, a dibasic aliphatic carboxylic acid, such as malonic acid, succinic acid, glutaric acid, adipic acid, pimelic acid, suberic acid, azelaic acid, sebacic acid, brassilic acid, and dodecanedioic acid; and a dibasic aromatic carboxylic acid, such as terephthalic acid and isophthalic acid. From an industrial viewpoint, a dibasic aliphatic carboxylic acid having 5 to 10 carbon atoms, especially 5 to 8 atoms, is preferable. Adipic acid is particularly preferable. Also, the derivative of the dibasic carboxylic acid includes an acid anhydride, or an ester with a lower alcohol having 1 to 5 carbon atoms, particularly 1 to 3 carbon atoms, of each of the above-mentioned acids. Examples of the lower alcohol are alcohols of lower alkyls such as methyl alcohol, ethyl alcohol and propyl alcohol. From an industrial viewpoint, methyl glutarate and methyl adipate are preferable. Epichlorohydrin, epibromohydrin, or the like may be used for the epihalohydrin. These compounds may be used singly or in combination.

(6) Amphoteric Starch

The amphoteric starch used in this invention may be prepared by reacting the above-mentioned cationic starch with a phosphate, such as a sodium tripolyphosphate, sodium hexametaphosphate, and a sodium polyphosphate, or with urea and a phosphate.

(7) Amphoteric Polyacrylamide Compound

The amphoteric polyacrylamide used in the present invention may be prepared by copolymerizing a cationic monomer, an anionic monomer and an acrylamide, by a Hoffmann rearrangement or a Mannich modification of an anionic polyacrylamide compound, or by an amide-exchange reaction with a polyamine.

As mentioned above, one of the methods for obtaining the amphoteric polyacrylamide compound of the invention is to copolymerize a cationic monomer, an anionic monomer and an acrylamide. For the cationic monomer may be used the cationic monomer employed to prepare the cationic polyacrylamide compound described hereinabove. These cationic monomers may be used singly or two or more of them may be used in combination.

For the acrylamide compound used for preparing the amphoteric polyacrylamide compound of the present invention may be used the acrylamide compound employed to prepare the cationic polyacrylamide compound described above. These acrylamide compounds may be used singly or in combination. Also, nonionic monomers, such as acrylonitrile, methyl (meth)acrylate, and ethyl (meth)acrylate may be incorporated into the reaction, as long as the amount of the nonionic monomers are such that they do not hamper the water-solubility of the polyacrylamide compound.

The anionic monomer used in the preparation of the amphoteric polyacrylamide compound of the present invention includes, for example, an $\alpha,\beta$-unsaturated monocarboxylic acid such as acrylic acid and methacrylic acid; an $\alpha,\beta$-unsaturated dicarboxylic acid such as maleic acid, fumaric acid, itaconic acid, and citraconic acid; and an unsaturated sulfonic acid such as styrene sulfonic acid and vinyl sulfonic acid, and a salt thereof, such as a sodium salt, a potassium salt and an ammonium salt thereof.

The Mannich-modified polyacrylamide compound used in the present invention may be prepared by modifying an anionic polyacrylamide compound with formamide and an amine through a Mannich reaction.

The anionic polyacrylamide compound may be prepared from the anionic monomer and the acrylamide which we described in the paragraphs about the amphoteric polyacrylamide compound. The amount of the anionic monomers should be 20 mol % or less, preferably 12 mol % or less based on the total amount of the monomers, i.e. the anionic monomers and the acrylamides. If the amount exceeds 20 mol %, a sufficient improvement in drainage may not be achieved. Amines that are typically used in the Mannich reaction may be those used for preparing the cationic polyacrylamide compound. The degree of modification through the Mannich reaction should be 1 mol % or more, preferably 10 mol % or more. When the degree is less than 1 mol %, a sufficient improvement in drainage may not be achieved. The degree of Mannich modification means the mol percent of formaldehyde and the amines used based on the amide groups in the polyacrylamide compound.

For the cationic component and the amphoteric component are preferable the cationic starch and the cationic polyacrylamide compound, and the amphoteric starch and the amphoteric polyacrylamide compound, respectively. Furthermore, the combination of the cationic starch and/or the amphoteric starch, and the cationic polyacrylamide and/or the amphoteric polyacrylamide is preferable.

<Retention Aid>

The retention aid according to the present invention includes a silica sol, which is prepared by the reaction between an aqueous solution of sodium silicate and an mineral acid, having a $SiO_2$ concentration [C] of 15 to 50 g/L and a viscosity of $0.12\times[C]$ mPa·s to 15 mPa·s in the concentration range, measured at 25° C. We have already explained the silica sol.

The retention aid may include, in addition to the silica sol, other common papermaking additives without limitation as long as the inclusion of such additives does not adversely affect achieving the objectives of the present invention. Such common additives are listed below, under item (3) "Chemicals Used in Combination".

<Papermaking Method>

The method of papermaking in accordance with the present invention is explained in the followings.

The present method is characterized by papermaking that includes the step of adding the silica sol and the cationic component and/or the amphoteric component in pulp slurry.

(1) Amount of Silica Sol

The amount of the silica sol added is usually 0.001 to 1%, preferably 0.002 to 0.3%, and more preferably 0.003 to 0.2%, based on the weight of dried pulp in the slurry. When the amount is less than 0.001%, the sufficient effects of the addition may not be obtained. On the other hand, from an economic viewpoint, the amount should not exceed 1%.

The amount of the cationic component and/or the amphoteric component should be 0.001 to 5%, preferably 0.002 to 2%, and more preferably 0.003 to 1.5%, based on the weight of the dried pulp in the slurry.

Although the ratio of the amount of the silica sol to that of the cationic component and/or the amphoteric component is different depending on the conditions including the kinds of pulp, the ratio is usually 10/1 to 1/100, preferably 5/1 to 1/50. Note that the "amount" here is the percentage based on the weight of the solids, as defined above.

(2) Method of Addition

The method of adding the silica sol and the cationic component and/or the amphoteric component in pulp slurry may include adding a mixture liquid thereof, which is obtained by mixing the above-mentioned ingredients in advance, and which is an example of the retention aid of the present invention, to slurry; adding the ingredients simultaneously; and adding each ingredient successively. However, a preferable way is to add the cationic component and/or the amphoteric component first, which is followed by the addition of the silica sol.

In the above-mentioned method, the $SiO_2$ concentration of the silica sol should be adjusted so that the concentration is in the specified range when it is added.

The silica sol and the cationic component and/or the amphoteric component may be introduced into the papermaking machine from any place of the mixing chest, the machine chest, the stuff box, the inlet/outlet of the fan pump, the inlet/outlet of the screen, and the white water pit. Preferably, the cationic component and/or the amphoteric component should be introduced from the stuff box, and/or the inlet/outlet of the fan pump, and the silica sol from the inlet/outlet of the fan pump, and/or the inlet/outlet of the screen.

(3) Chemicals Used in Combination

There is no limitation on the use of other additives commonly employed in papermaking and paper board-making. Such additives maybe used, if necessary. Examples of the additives are water-soluble aluminum salts, such as aluminum sulfate, polyaluminum chloride, polyaluminum hydroxide, and polyaluminum silicate sulfate; fillers, such as titanium oxide, clay, talc., calcium carbonate, white carbon, and urea resin; strength additives, such as an anionic polyacrylamide compound, melamine-formaldehyde resin, urea-formaldehyde resin, a polyvinyl alcohol, and carboxymethylcellulose; sizing agents, such as. a rosin soap, an acidic rosin emulsion sizing agent, a neutral rosin emulsion sizing agent, an alkyl ketene-dimer-based sizing agent, an alkenylsuccinic anhydride-based sizing agent, α-hydroxycarbonic acid, a bisaliphatic acid amide and a synthesized sizing agent (a saponified compound of an alkenylsuccinic acid); paper-bulking agents; dyes; fluorescent dyes; slime control agents; and defoaming agents.

Conventional retention aids and drainage aids may be used together with the retention aid of the invention. Examples of these aids are an anionic high molecular weight poly (meth) acrylamide, a polyethylene oxide, and bentonite such as smectite, montmorillonite, and hectorite.

Furthermore, the paper and the paperboard may be coated with starch, polyvinylalcohol, dye, coating color, antislipping agents, surface sizing agents, and polyacrylamide surface strength agents, if necessary. The coating may be carried out with such a device as a size press, a film press, a gate roll coater, a blade coater, or a calender.

(4) Kinds of Raw Material Pulp, Paper and Paperboard

When various kinds of paper and paperboard are manufactured in an acidic and neutral pH range that extends to a slightly alkaline range, any of bleached or unbleached chemical pulp such as kraft pulp, sulfite pulp, etc.; bleached or unbleached high yield pulp such as ground pulp, mechanical pulp, thermomechanical pulp, etc.; and waste paper pulp such as waste newsprint paper pulp, waste magazine paper pulp, waste corrugated board pulp, deinked waste paper pulp, etc. can be used as pulp stock. Also, a mixture of the above-mentioned pulp material and any one of asbestos, polyamide, polyester, polyolefin, etc. can be used.

The papermaking method according to the present invention can be employed in manufacturing paper and paperboard in an acidic and neutral pH range, preferably under a weakly acidic to neutral condition of pH 5 to 9.

Examples of the paper and the paperboard are printing and writing paper, base paper for coated paper, PPC paper, inkjet recording paper, printed information paper, pressure-sensitive recording paper, base paper for photographic paper, book paper, photographic paper, wrapping paper, machine grazed paper, base paper for pressure-sensitive paper, base paper for heat-sensitive paper, wood containing paper, flame proof paper, newsprint paper, metal-including paper, white board, base paper for gypsum board, liner board, can liner, corrugating medium, and base paper for tube board.

EXAMPLES

The invention is described by way of working examples. Needless to say, the invention is not limited to these examples only. In the following examples, the word "part" means "part by weight of the solids", unless special remarks.

The experimental methods of the working examples and comparative examples are as follows.

(a) Preparation of Silica Sol

The specific silica sol liquid for each working example and comparative example was prepared in the Y-shaped tubular reactor shown in FIG. 1. The reactor had an aqueous sodium silicate feeding tube, of which inner diameter at the throttled part was 1.2 mm, a sulfuric acid feeding tube, of which inner diameter at the throttled part was 1.4 mm, and a discharging tube, of which inner diameter was 6 mm.

(b) Measurement of the Viscosity

The viscosity of each silica sol was measured with a BL-type viscometer produced by TOKIMEC Inc., using a No. 1 rotor at 60 rpm at 25° C.

(c) Measurement of the pH

The pH value of each silica sol was measured with an HM-50V detector produced by DKK-TOA Corporation.

<Preparation of Silica Sol>

Preparation Example 1

A sulfuric acid aqueous solution having a concentration of 199.4 g/L, and an aqueous solution of sodium silicate, in which the molar ratio of $SiO_2$ to $Na_2O$ was 3.05, having a $SiO_2$ concentration of 289.6 g/L were fed into the Y-shaped tube reactor at a flow rate of 0.97 L/minute and that of 1.01 L/minute, respectively. 10 L of silica sol was obtained. The flow velocity of the sulfuric acid aqueous solution and that of the aqueous sodium silicate solution, both fed to the reaction part of the reactor, were 10.5 m/s and 14.9 m/s, respectively. The flow velocity of the fluid discharged from the reactor was 1.2 m/s. The silica sol obtained had a $SiO_2$ concentration of 147.7 g/L, a pH value of 1.4, and a viscosity of 4.8 mPa·s at 32° C.

The silica sol obtained by the method described above was divided into two portions. One portion was allowed to age at a liquid temperature of 30° C. for 120 minutes and the other for 200 minutes at the same temperature. This step is the aging at the first stage. Thus, high concentration silica sol samples were obtained. 85 ml of each high concentration silica sol sample was diluted with 417 mL of water, and silica sol sample A and silica sol sample B, each of which has a $SiO_2$ concentration of 25 g/L and a pH of 1.98, were obtained.

Silica sol samples A and B were allowed to stand at a room temperature, and then their storage stability was checked. As a result, silica sol sample A was stable for 35 days without causing gelation, and silica sol sample B for 20 days.

Preparation Example 2

A sample of the same silica sol as silica sol sample A obtained in Preparation Example 1 was allowed to age at 25° C. for 7 days, which was the aging at the second stage. This sample after the second aging was named sample C. Another sample of the same silica sol as silica sol sample A was also allowed to age at 25° C., but for 28 days. This second sample was named sample D.

Preparation Example 3 for Comparative Examples

A sample of the same silica sol as silica sol sample B obtained in Preparation Example 1 was allowed to mature at 25° C. for 28 days, which was the aging at the second stage. This sample was named sample E.

Preparation Example 4 for Comparative Examples

Silica sol sample F was prepared. The steps of the preparation were the same as those of preparing silica sol sample B in Preparation Example 1, except that a sulfuric acid aqueous solution having a concentration of 68.2 g/L and an aqueous solution of sodium silicate having a $SiO_2$ concentration of 101.5 g/L were used instead of the aqueous solutions used in Preparation Example 1. The $SiO_2$ concentration of silica sol sample F after the first aging was 52.4 g/L and the viscosity thereof measured at 25° C. was 2.3 mPa·s.

Preparation Example 5

The steps of the preparation in Preparation Example 1 were repeated before the first aging. The silica sol was allowed to mature at a liquid temperature of 30° C. for 150 minutes. A high concentration silica sol having a viscosity of 10.2 mPa·s was obtained. Then, 85 mL of this silica sol was diluted with 229 mL of water. The diluted silica sol was allowed to stand at 25° C. for 3 days, which was the aging at the second stage. Then, silica sol sample I was obtained. Silica sol sample I had a $SiO_2$ concentration of 40 g/L and a viscosity of 6.1 mPa·s.

The preparation conditions and the properties of silica sol samples A-F and I are shown in Table 1. The values of specific surface area were measured by titration of Sears method.

Then, silica sol samples A to F were employed in papermaking. Colloidal silica products available on the market, of which product names were BMA0 and BMA780, both produced by Nissan EkaNobel Inc., were also used in papermaking. The former colloidal silica was named silica sol sample G, and the latter silica sol sample H. The properties of samples G and H are also shown in Table 1.

TABLE 1

Production Conditions of Silica Sol Samples

Conditions and properties of silica sol samples at the stage of preparation and first aging

| Silica sol sample | $SiO_2$ concentration (g/L) | PH | Aging temp. (° C.) | Aging time (min.) | Viscosity (mpa · s) |
|---|---|---|---|---|---|
| A | 147.7 | 1.4 | 30 | 120 | 7.0 |
| B | 147.7 | 1.4 | 30 | 200 | 11.4 |
| C | 147.7 | 1.4 | 30 | 120 | 7.0 |
| D | 147.7 | 1.4 | 30 | 120 | 7.0 |
| E | 147.7 | 1.4 | 30 | 200 | 11.4 |
| F | 52.4 | 1.4 | 30 | 200 | 2.3 |
| I | 147.7 | 1.4 | 30 | 150 | 10.2 |

| | Active ingredient (%) | Viscosity at conc. of 20 g/L (mPa · s) | Viscosity at conc. of 50 g/L (mPa · s) |
|---|---|---|---|
| G | 15 | 2.8 | 3.5 |
| H | 7.5 | 3.2 | 4.6 |

TABLE 1-continued

Production Conditions of Silica Sol Samples

Conditions and properties of silica sol samples at the stage of dilution and second aging

| Silica sol sample | $SiO_2$ concentration (g/L) | pH | Aging temp. (° C.) | Aging time (days) | Viscosity (mPa · s) | *1) | *2) |
|---|---|---|---|---|---|---|---|
| A | 25 | 1.98 | — | — | 3.1 | 900 | 99.5 |
| B | 25 | 1.98 | — | — | 3.8 | 850 | 99.0 |
| C | 25 | 1.98 | 25 | 7 | 3.2 | 830 | 95.0 |
| D | 25 | 1.98 | 25 | 28 | 5.9 | 800 | 91.0 |
| E | 25 | 1.98 | 25 | 28 | 46.7 | 700 | 77.6 |
| F | 25 | 1.98 | — | — | 2 | 1100 | 99.5 |
| I | 40 | 1.92 | 25 | 3 | 6.1 | 900 | 93.0 |

| | pH | $SiO_2/Al_2O_3$ |
|---|---|---|
| G | 9.9 | 100/0 |
| H | 8.8 | 95/5 |

*1) specific surface area (m²/g)
*2) light transmittance (%)

<Preparation of Cationic or Amphoteric Component>

Components A-H shown in Table 2 were used for the cationic or the amphoteric component in papermaking.

TABLE 2

Cationic or Amphoteric Component

| Component name | Component | Product name | Manufacturer |
|---|---|---|---|
| A | Cationic starch | cato308 | Japan NSC Corporation |
| B | Amphoteric starch | cato3210 | Japan NSC Corporation |
| C | Cationic polyacrylamide compound | Highholder 222 | Kurita Industries Inc. |
| D | Amphoteric polyacrylamide compound | DS473 | Japan PMC Corporation |
| E | Amphoteric polyacrylamide compound | DS477 | Japan PMC Corporation |
| F | Polyamidepolyamine epichlorohydrin resin | WS525 | Japan PMC Corporation |
| G | High cationic polymer | AC890 | Japan PMC Corporation |
| H | Amine-epichlorohydrin resin | AC880 | Japan PMC Corporation |

Working Example 1

A mixed pulp of L-BKP (a bleached hardwood kraft pulp) and N-BKP (a bleached softwood kraft pulp), the ratio of the former to the latter being 90/10, was beaten to a Canadian Standard freeness of 400. To 100 parts of the obtained pulp slurry were added 10 parts of calcium carbonate, of which product name was TP-121 produced by Okutama Kogyo, 0.5 part of aluminum sulfate, 0.1 part of an alkylketene dimer emulsion sizing agent, of which product name was AS263 supplied by Japan PMC Corporation, and one part of component B successively, and then 0.03 part of silica sol sample A. The mixture was dispersed uniformly and a papermaking raw material slurry was prepared. With silica sol samples B-D and I, the same steps were carried out. The pH value of each of the raw material slurries was 8.0. Each of the raw material slurries was made into paper using a Tappi standard sheet machine, so that the handsheet had a basic weight of 65 g/m². Then, the obtained wet web was compressed for dehydration and dried for 80 seconds at 100° C.

The obtained alkaline paper samples were kept at 23° C. under 50% RH for 24 hours so that their moisture contents were adjusted. Then, the content of the filler included in each sample was measured. Also, the transmittance of the white water discharged during making paper was measured with each sample. The results are shown in Table 3.

TABLE 3

Results of Working Example 1

| Component | Amount added (part) | Silica sol sample | Amount added (part) | RDDT (%) | Content of filler (%) |
|---|---|---|---|---|---|
| B | 1.0 | A | 0.03 | 91.1 | 8.6 |
| B | 1.0 | B | 0.03 | 91.2 | 8.7 |
| B | 1.0 | C | 0.03 | 91.3 | 8.7 |
| B | 1.0 | D | 0.03 | 92.1 | 8.7 |
| B | 1.0 | I | 0.03 | 91.4 | 8.7 |

These measurements were carried out in accordance with the following methods.

Content of filler: according to JIS P-8128. When the filler was calcium carbonate, the measured value was multiplied by 1.78 and the content of calcium carbonate was calculated. Transmittance of white water (RDDT): Into an apparatus similar to "Modified Hercules Dynamic Drainage Tester" (with a jar having a diameter of 7.5 cm) described in the proceedings of Tappi Papermakers Conference (1985), p. 171, pulp slurry was poured. Air was blown from the bottom while the pulp slurry was being agitated so that a mat was not formed. The apparatus had a structure which allows filtration simultaneously with the cease of agitation and aeration. 300 mL of pulp slurry was poured into the jar and 70 mL of the filtrate was collected. The transmission of the filtrate at a wavelength of 620 nm was measured. This value was used as a parameter of the first pass retention. The more transparent the filtrate is, the higher are the retention of the filler and fines.

Transmittance of white water: The transmittance at a wavelength of 620 nm was measured with a U1000 spectrophotometer supplied by Hitachi, Ltd.

The alkaline paper may fall under an example of printing and writing paper, base paper for coated paper, PPC paper, inkjet recording paper, printed information paper, book paper, or the like.

Comparative Example 1

The steps in Working Example 1 were repeated, except that silica sol samples E-H were used instead of silica sol sample A, or silica sol was not used at all. The content of filler in each of the obtained alkaline paper samples and the transmittance of the white water discharged during making each paper sample were measured. The results are shown in Table 4.

TABLE 4

Results of Comparative Example 1

| Component | Amount added (part) | Silica sol Sample | Amount added (part) | RDDT (%) | Content of filler (%) |
|---|---|---|---|---|---|
| B | 1.0 | E | 0.03 | 81.9 | 7.7 |
| B | 1.0 | F | 0.03 | 76.6 | 7.1 |
| B | 1.0 | G | 0.03 | 81.6 | 7.6 |
| B | 1.0 | H | 0.03 | 85.9 | 7.9 |
| B | 1.0 | No | 0 | 65.5 | 6.6 |

Working Example 2

The steps in Working Example 1 were repeated, except that 0.02 part of component C was used instead of 1 part of component B. The content of filler in each of the obtained alkaline paper samples and the transmittance of the white water discharged during making each paper sample were measured. The results are shown in Table 5.

The alkaline paper may fall under an example of printing and writing paper, base paper for coated paper, PPC paper, inkjet recording paper, printed information paper, book paper, or the like.

TABLE 5

Results of Working Example 2

| Component | Amount added (part) | Silica sol sample | Amount added (part) | RDDT (%) | Content of filler (%) |
|---|---|---|---|---|---|
| C | 0.02 | A | 0.03 | 89.1 | 8.4 |
| C | 0.02 | B | 0.03 | 89.3 | 8.5 |
| C | 0.02 | C | 0.03 | 89.5 | 8.5 |
| C | 0.02 | D | 0.03 | 90.1 | 8.6 |
| C | 0.02 | I | 0.03 | 89.6 | 8.6 |

Comparative Example 2

The steps in Working Example 2 were repeated, except that silica sol samples E-H were used instead of silica sol sample A, or silica sol was not used at all. The content of filler in each of the obtained alkaline paper samples and the transmittance of the white water discharged during making each paper sample were measured. The results are shown in Table 6.

TABLE 6

Results of Comparative Example 2

| Component | Amount added (part) | Silica sol sample | Amount added (part) | RDDT (%) | Content of filler (%) |
|---|---|---|---|---|---|
| C | 0.02 | E | 0.03 | 80.6 | 7.7 |
| C | 0.02 | F | 0.03 | 75.2 | 7.2 |
| C | 0.02 | G | 0.03 | 79.4 | 7.5 |
| C | 0.02 | H | 0.03 | 84.4 | 7.8 |
| C | 0.02 | No | 0 | 70.2 | 6.8 |

Working Example 3

A mixed pulp of L-BKP. (a bleached hardwood kraft pulp), N-BKP (a bleached softwood kraft pulp), and deinked waste paper pulp, the ratio of L-BKP to N-BKP to deinked waste paper pulp being 70/10/20, was beaten to a Canadian Standard freeness of 350. To 100 parts of the obtained pulp slurry were added 20 parts of talc, of which product name was talc-ND produced by Nippon Talc Co., Ltd., 1 part of aluminum sulfate, 0.3 part of a rosin sizing agent, of which product name was AL120 supplied by Japan PMC Corporation, and 0.5 part of component A successively, and then 0.05 part of silica sol sample A. The mixture was dispersed uniformly and a papermaking raw material slurry was prepared. With silica sol samples B-D and I, the same steps were carried out. The pH value of each of the raw material slurries was 5.5. Each of the raw material slurries was made into paper using a Tappi standard sheet machine, so that the handsheet had a basic weight of 70 g/m². Then, the obtained wet web was compressed for dehydration and dried for 100 seconds at 100° C. The obtained weakly acidic paper samples were kept at 23° C. under 50% RH for 24 hours so that their moisture contents were adjusted. Then, the content of the filler included in each sample was measured. Also, the transmittance of the white water discharged during making paper was measured with each sample. The results are shown in Table 7.

The weakly acidic paper may fall under an example of printing and writing paper, base paper for coated paper, PPC paper, inkjet recording paper, printed information paper, book paper, or the like.

TABLE 7

Results of Working Example 3

| Component | Amount added (part) | Silica sol sample | Amount added (part) | RDDT (%) | Content of filler (%) |
|---|---|---|---|---|---|
| A | 0.5 | A | 0.05 | 89.1 | 14.8 |
| A | 0.5 | B | 0.05 | 89.4 | 14.8 |
| A | 0.5 | C | 0.05 | 89.5 | 14.8 |
| A | 0.5 | D | 0.05 | 89.8 | 14.9 |
| A | 0.5 | I | 0.05 | 89.6 | 14.8 |

Comparative Example 3

The steps in Working Example 3 were repeated, except that silica sol samples E-H were used instead of silica sol sample A, or silica sol was not used at all. The content of filler in each of the obtained weakly acidic paper samples and the transmittance of the white water discharged during making each paper sample were measured. The results are shown in Table 8.

TABLE 8

Results of Comparative Example 3

| Component | Amount added (part) | Silica sol sample | Amount added (part) | RDDT (%) | Content of filler (%) |
|---|---|---|---|---|---|
| A | 0.5 | E | 0.05 | 83.3 | 14.4 |
| A | 0.5 | F | 0.05 | 76.5 | 13.4 |
| A | 0.5 | G | 0.05 | 82.5 | 14.3 |
| A | 0.5 | H | 0.05 | 86.1 | 14.5 |
| A | 0.5 | No | 0 | 71.7 | 12.6 |

Working Example 4

A mixed pulp of L-BKP (a bleached hardwood kraft pulp) and N-BKP (a bleached softwood kraft pulp), the ratio of the former to the latter being 90/10, was beaten to a Canadian Standard freeness of 450. To 100 parts of the obtained pulp slurry were added 20 parts of calcium carbonate, of which product name was TP-121 produced by Okutama Kogyo, 1 part of aluminum sulfate, 0.5 part of component A, one of components C-H in the amount shown in Table 9, 0.05 part of an alkenylsuccinic acid an hydride sizing agent, of which product name was AS280 supplied by Japan PMC Corporation, and 0.02 part of silica sol sample A successively. The mixtures were dispersed uniformly and papermaking raw material slurries were prepared. The pH value of each of the raw material slurries was 7.8. Each of the raw material slurries was made into paper using a Tappi standard sheet machine, so that the handsheet had a basic weight of 70 g/m². Then, the obtained wet web was compressed for dehydration and dried for 100 seconds at 100° C. The obtained alkaline paper samples were kept at 23° C. under 50% RH for 24 hours so that their moisture contents were adjusted. Then, the content of the filler included in each sample was measured. Also, the light transmittance of the white water discharged during making paper was measured with each sample. The results are shown in Table 9.

The alkaline paper may fall under an example of printing and writing paper, base paper for coated paper, PPC paper, inkjet recording paper, printed information paper, book paper, or the like.

TABLE 9

Results of Working Example 4

| Component A (Part) | Component | Amount added (part) | Silica sol Sample | Amount added (part) | RDDT (%) | Content of filler (%) |
|---|---|---|---|---|---|---|
| 0.5 | C | 0.02 | A | 0.02 | 92.2 | 15.1 |
| 0.5 | D | 0.4 | A | 0.02 | 90.3 | 15.0 |
| 0.5 | E | 0.4 | A | 0.02 | 90.0 | 14.9 |
| 0.5 | F | 0.05 | A | 0.02 | 89.9 | 14.8 |
| 0.5 | G | 0.05 | A | 0.02 | 89.3 | 14.7 |
| 0.5 | H | 0.1 | A | 0.02 | 89.2 | 14.7 |
| 0.5 | — | 0 | A | 0.02 | 87.1 | 14.6 |

Comparative Example 4

The steps in Working Example 4 were repeated, except that silica sol sample H was used instead of silica sol sample A, or silica sol was not used at all. The content of filler in each of the obtained alkaline paper samples and the transmittance of the white water discharged during making each paper sample were measured. The results are shown in Table 10.

TABLE 10

Results of Comparative Example 4

| Component A (Part) | Component | Amount added (part) | Silica sol Sample | Amount added (part) | RDDT (%) | Content of filler (%) |
|---|---|---|---|---|---|---|
| 0.5 | C | 0.02 | H | 0.02 | 87.0 | 14.5 |
| 0.5 | D | 0.4 | H | 0.02 | 86.0 | 14.2 |
| 0.5 | E | 0.4 | H | 0.02 | 85.8 | 14.2 |
| 0.5 | F | 0.05 | H | 0.02 | 84.1 | 14.1 |
| 0.5 | G | 0.05 | H | 0.02 | 82.3 | 14.1 |
| 0.5 | H | 0.1 | H | 0.02 | 81.9 | 14.0 |
| 0.5 | — | 0 | H | 0.02 | 81.3 | 13.9 |
| 0.5 | C | 0.02 | No | 0 | 78.9 | 13.6 |
| 0.5 | D | 0.4 | No | 0 | 77.9 | 13.5 |
| 0.5 | E | 0.4 | No | 0 | 77.4 | 13.5 |
| 0.5 | F | 0.05 | No | 0 | 70.3 | 12.9 |
| 0.5 | G | 0.05 | No | 0 | 68.9 | 12.8 |
| 0.5 | H | 0.1 | No | 0 | 68.3 | 12.8 |
| 0.5 | — | 0 | No | 0 | 58.1 | 12.1 |

Working Example 5

Waste corrugated fiberboard was beaten to a pulp concentration of 2% and a Canadian Standard freeness (CSF) of 370. To 100 parts of the obtained pulp slurry were added 0.5 part of aluminum sulfate, 1.0 part of component C or D, 0.3 part of a rosin sizing agent, of which product name was CC167 supplied by Japan PMC Corporation, and 0.1 part of silica sol sample A successively. The mixtures were dispersed uniformly and papermaking raw material slurries were prepared. The pH value of each of the raw material slurries was 6.1. Each of the raw material slurries was made into paper using a Tappi standard sheet machine, so that the handsheet had a basic weight of 80 g/m². Then, the obtained wet web was compressed for dehydration and dried for 90 seconds at 110° C. The obtained handsheet samples were kept at 23° C. under 50% RH for 24 hours so that their moisture contents were adjusted. Then, the tests on the samples were carried out. Specifically, the content of the filler included in each sample was measured. Also, the transmittance of the white water discharged during making paper was measured with each sample. The results are shown in Table 11. Note that filler was not used in this working example, but the waste corrugated fiberboard included 10.2% of ash, which corresponds to filler.

The handsheet may fall under an example of base paper for gypsum board, liner board, corrugating medium, and base paper for tube board, or the like.

TABLE 11

Results of Working Example 5

| Component | Amount added (part) | Silica sol sample | Amount added (part) | RDDT (%) | Content of filler (%) |
|---|---|---|---|---|---|
| C | 1.0 | A | 0.1 | 84.1 | 8.7 |
| D | 1.0 | A | 0.1 | 83.0 | 8.8 |

Comparative Example 5

The steps in Working Example 5 were repeated, except that silica sol sample H was used instead of silica sol sample A, or silica sol was not used at all. The content of filler in each of the obtained handsheet samples and the transmittance of the white water discharged during making each paper sample were measured. The results are shown in Table 12.

TABLE 12

Results of Comparative Example 5

| Component | Amount added (part) | Silica sol sample | Amount added (part) | RDDT (%) | Content of filler (%) |
|---|---|---|---|---|---|
| C | 1.0 | H | 0.1 | 79.8 | 8.4 |
| D | 1.0 | H | 0.1 | 77.6 | 8.3 |
| C | 1.0 | No | 0 | 66.7 | 6.8 |
| D | 1.0 | No | 0 | 64.7 | 6.7 |

Working Example 6

The steps of Working Example 3 with employing silica sol sample A were repeated, except that the amount of aluminum sulfate was varied. Specifically, 0.5 part, 1 part, and 2 parts of aluminum sulfate were used. The pH value of the papermaking raw material slurry including 0.5 part of aluminum sulfate was 6.5, that including 1 part 5.5, and that including 2 parts 4.5. The content of filler in each of the obtained handsheet samples and the transmittance of the white water discharged during making each paper sample were measured. The results are shown in Table 13. Also, the obtained handsheet may fall under an example of printing and writing paper, base paper for coated paper, PPC paper, inkjet recording paper, printed information paper, book paper, or the like.

TABLE 13

Results of Working Example 6

| Aluminum sulfate (part) | Component | Amount added (part) | Silica sol Sample | Amount added (part) | RDDT (%) | Content of filler (%) |
|---|---|---|---|---|---|---|
| 0.5 | A | 0.5 | A | 0.05 | 91.6 | 15.1 |
| 1 | A | 0.5 | A | 0.05 | 89.1 | 14.8 |
| 2 | A | 0.5 | A | 0.05 | 86.7 | 14.6 |

Working Example 7

The steps of papermaking in Working Example 2 with employing silica sol sample A were repeated except for the changes shown in Table 14. Specifically, the order of the addition of component C and silica sol sample A was changed, or the addition of component C was followed by a strong agitation for 10 minutes with a mixer for household use before the addition of silica sol sample A. The content of filler in each of the obtained alkaline paper samples, the sheet formation index of each paper sample, and the transmittance of the white water in making each paper sample were measured. The results are shown in Table 14.

The sheet formation index was measured with a FMT2000 formation tester produced by Nomura Shoji Co., Ltd. The less the measured value is, the better is the sheet formation of paper.

The obtained alkaline paper may fall under an example of printing and writing paper, base paper for coated paper, PPC paper, inkjet recording paper, printed information paper, book paper, or the like.

TABLE 14

Results of Working Example 7

| Component C (part) | Silica sol Sample A (part) | Order of addition | Use of Mixer | RDDT (%) | Content of filler (%) | Sheet formation index |
|---|---|---|---|---|---|---|
| 0.02 | 0.03 | C→A | No | 89.1 | 8.4 | 36.5 |
| 0.02 | 0.03 | C→A | Yes | 89.0 | 8.4 | 33.3 |
| 0.02 | 0.03 | A→C | No | 86.0 | 8.0 | 39.1 |

Working Example 8

The steps of papermaking in Working Example 1 were repeated, except that component A was used instead of component B and silica sol sample A was used. The content of filler in the obtained alkaline paper sample was 8.5%, and the transmittance of the white water (RDDT) in making the paper sample was 90.5%.

<Discussion>

Comparison between Working Example 2 and Working Example 7 shows that the addition of the cationic component and/or the amphoteric component followed by that of the silica sol brings about more improved retention. Furthermore, the method in which the addition of the cationic component and/or the amphoteric component is followed by the application of shearing force, and the silica sol was added thereafter improves the sheet formation of paper.

Comparison between Working Example 3 and Working Example 6 shows that the embodiment in which the content of aluminum sulfate added is smaller and the pH value is greater provides a better retention improving effect.

Comparison between Working Example 1, Working Example 2 and Working Example 8 shows that the amphoteric starch or the cationic starch as the cationic component and/or the amphoteric component works better than the cationic polyacrylamide compound or the amphoteric polyacrylamide compound.

Example 4 proves that the use of other cationic components and/or amphoteric components in addition to the cationic starch and/or the amphoteric starch enhances the retention improving effect. Also can be understood that the cationic polyacrylamide compound and the amphoteric polyacrylamide compound are excellent for the compounds employed together with the cationic starch and/or the amphoteric starch.

INDUSTRIAL APPLICABILITY

The present invention employs a silica sol having a specific concentration and viscosity together with a cationic component and/or an amphoteric component, which provides an enhanced retention improving effect.

We claim:

1. A method for papermaking, said method comprising:
   reacting an aqueous solution of sodium silicate with a mineral acid to produce a silica sol with a $SiO_2$ concentration from 15 to 50 g/L and a viscosity from $(0.12\times[C])$ mPa·s to 15 mPa·s measured at 25° C. under the $SiO_2$ concentration, wherein [C] denotes a value from 15 to 50 which corresponds to the $SiO_2$ concentration of the silica sol;
   adding the silica sol, and a cationic component and/or an amphoteric component to pulp slurry; and
   making paper from the pulp slurry containing the silica sol, and the cationic component and/or the amphoteric component.

2. The method as claimed in claim 1, wherein the silica sol has a pH of 3 or less.

3. The method as claimed in claim 1, wherein said silica sol is produced by:
   preparing a high concentration silica sol which has a high $SiO_2$ concentration ranging between 100 g/L and 200 g/L, and has a viscosity from $(0.06\times[C])$ mPa·s to 30 mPa·s measured at 25° C. under the high $SiO_2$ concentration, wherein [C] denotes a value from 100 to 200 which corresponds to the high $SiO_2$ concentration of the silica sol, and
   diluting the high concentration silica sol prior to storage.

4. The method as claimed in claim 3, wherein the high concentration silica sol has a pH of 1.3 to 3.

5. The method as claimed in claim 1 or 2, wherein the silica sol is further diluted before adding to the pulp slurry.

6. The method as claimed in claim 1, wherein the silica sol is prepared in the following three steps:
   (1) reacting the aqueous solution of sodium silicate with the mineral acid to obtain a high concentration silica sol precursor, the high concentration silica sol precursor having a high $SiO_2$ concentration ranging between 100 g/L and 200 g/L;
   (2) aging the high concentration silica sol precursor for a predetermined time period to produce a high concentration silica sol with a viscosity from $(0.06\times[C])$ mPa·s to 30 mPa·s measured at 25° C. under the high $SiO_2$ concentration, wherein C denotes a value from 100 to 200 which corresponds to the high $SiO_2$ concentration of the silica sol precursor; and
   (3) diluting the high concentration silica sol to produce the silica sol.

7. The method as claimed in claim 6, further comprising storing the silica sol wherein the silica sol is further aged while the silica sol is being stored.

8. The method as claimed in claim 7, wherein the predetermined time period is from 30 minutes to 200 minutes.

9. The method as claimed in claim 6, wherein the predetermined time period is from 30 minutes to 200 minutes.

10. The method as claimed in any one of claims 6-8, wherein the precursor has a pH of 3 or less.

11. A retention aid comprising a silica sol, wherein the silica sol is prepared by reacting an aqueous solution of sodium silicate with a mineral acid, and the silica sol has a $SiO_2$ concentration from 15 to 50 g/L and a viscosity from $(0.12\times[C])$ mPa·s to 15 mPa·s measured at 25° C. under the $SiO_2$ concentration, wherein [C] denotes a value from 15 to 50 which corresponds to the $SiO_2$ concentration of the silica sol.

12. The retention aid as claimed in claim 11, wherein the silica sol has a pH of 3 or less.

* * * * *